United States Patent

[11] 3,626,269

| [72] | Inventor | Donald O. Stanley<br>San Jose, Calif. |
|---|---|---|
| [21] | Appl. No. | 852,591 |
| [22] | Filed | Aug. 25, 1969 |
| [45] | Patented | Dec. 7, 1971 |
| [73] | Assignee | Calma Company |

[54] STEPPING MOTOR DRIVE
8 Claims, 5 Drawing Figs.

[52] U.S. Cl. .................................................. 318/696,
 318/415, 310/49
[51] Int. Cl. ........................................................ H02k 37/00
[50] Field of Search ................................................ 318/138,
 254, 696, 685, 415; 310/49

[56] References Cited
UNITED STATES PATENTS

| 3,297,927 | 1/1967 | Blakeslee et al. | 318/138 X |
| 3,381,193 | 4/1968 | Smith | 310/49 X |
| 3,386,018 | 5/1968 | Smith-Vaniz | 318/138 |
| 3,423,658 | 1/1969 | Barrus | 318/254 X |
| 3,444,447 | 5/1969 | Newell | 318/138 |
| 3,445,741 | 5/1969 | Gerber | 310/49 X |
| 3,514,680 | 5/1970 | Williams | 318/138 |

Primary Examiner—G. R. Simmons
Attorney—Fowler, Knobbe & Martens

ABSTRACT: Apparatus and method for efficiently driving an incremental motor at high or low speeds utilizing two different driving voltages, the higher of which drives the motor from one increment to the next, and the lower of which establishes detent positions; the lower voltage being utilized only when the motor is driven at low speed.

INVENTOR.
DONALD O. STANLEY

BY
FOWLER, KNOBBE
& MARTENS
ATTORNEYS.

INVENTOR.
DONALD O. STANLEY

BY
FOWLER, KNOBBE
& MARTENS
ATTORNEYS.

INVENTOR.
DONALD O. STANLEY

BY
FOWLER, KNOBBE
& MARTENS
    ATTORNEYS.

STEPPING MOTOR DRIVE

This invention applies to incremental stepping motor drive circuits, especially those used in incremental magnetic tape recorders. Systems employing incremental stepping motors have in the past been a compromise between two competing factors the tendency of the rotor to oscillate about a detent position, which is usually controlled by damping the rotor as through eddy current loss, and the difficulty in driving a damped motor at a high rate of speed. Since the amount of magnetic flux which the rotor of a stepping motor can conduct at any given time, and therefore the force exertable on the rotor, is limited by magnetic saturation of the rotor material, it is not possible to avoid this compromise by simply increasing both the damping and accelerating forces on the rotor. This interplay between oscillation and motor speed has produced, in the state of the art before the present invention, stepping motor systems which are limited in maximum speed, while still oscillating somewhat at the detent positions. This compromise, therefore, has been less than satisfactory.

To minimize oscillation at the detent positions, and simultaneously increase the maximum stepping rate of the motor, a new and novel control system for driving a stepping motor has been invented. In the present invention the stepping motor is still damped, but the limited magnetic flux of the rotor is utilized in the most advantageous way so that substantially all of the possible rotor flux works to overcome the damping forces in the motor, thereby permitting relatively high rotor damping while greatly increasing the maximum stepping rate.

Briefly, stepping motor systems constructed in accordance with the present invention comprise circuitry for locking the rotor in a given detent position by attracting two of a plurality of rotor poles to positions which straddle two stator poles, both of which are energized. This circuitry sequentially changes the pair of stator poles which is being energized such that each successive pair contains one stator pole from the immediately preceding pair. The rotor is thus forced to rotate through a plurality of detent positions, attracted in turn to positions wherein two rotor poles are locked about two energized stator poles. Without more, this motor would function, but the damping which is built into the motor to reduce oscillation would substantially limit the rate at which the rotor poles could be shifted from one detent position to the next. To overcome this limitation, the drive circuitry introduces an interim excitation, the purpose of which is to strongly accelerate the rotor between detent positions. In the preferred embodiment, the magnetic flux is terminated in one pole of the pole pair that made up the locking mechanism in the immediately preceding detent position while a strong energy pulse is applied to the other pole. This pulse therefore utilizes the available flux path through the rotor in the most advantageous way for accelerating the rotor. That is, all flux in the rotor is tending to rotate the rotor, and the stator pole which initiated the flux path is proximate the driven stator pole, so that the driving magnetic force is considerably higher than in the prior art systems.

In addition, the driving circuit is designed such that, when the motor is driven at a high rate of speed the locking function at various detent positions gradually disappears so that the motor is driven through succeeding positions solely through the use of the strong pulse on individual stator poles. Thus, at high speeds, virtually all of the magnetic flux which passes through the rotor is urging it to rotate, and exceedingly high rates of rotation are realizable.

With this general outline of the invention, the specific construction of the invention may readily be understood by reference to the drawings wherein.

DETAILED DESCRIPTION

Figure 1:
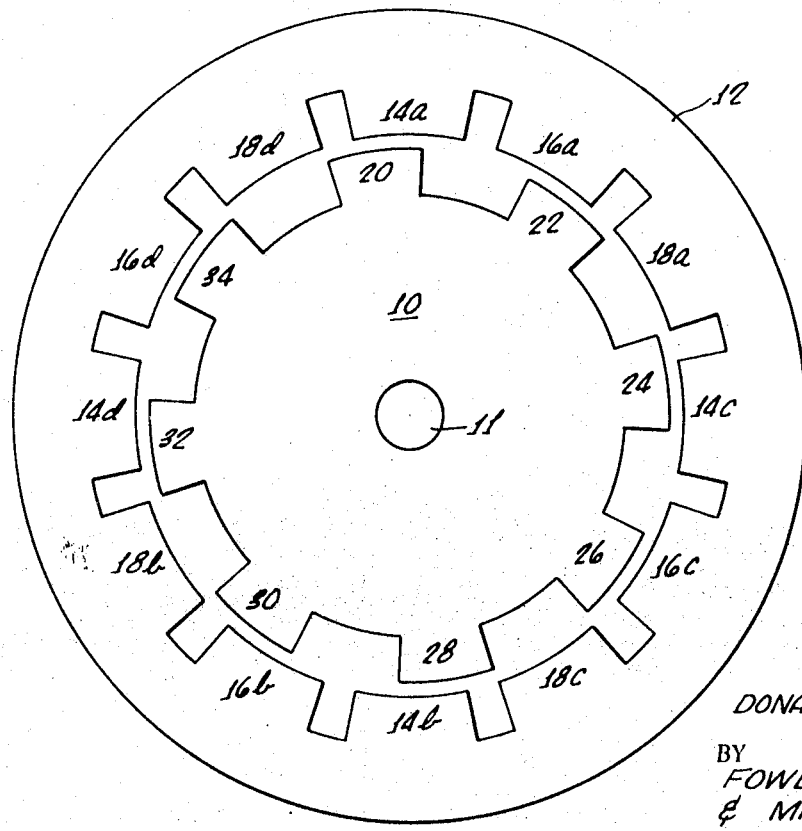
FIG. 1 is a schematic illustration of a stepping motor suitable for use with the invention showing the positional interrelation of rotor and stator poles with windings deleted from the stator poles for clarity.

Referring to FIG. 1, a stepping motor is schematically depicted comprising a rotor 10 which rotates about shaft 11 within a stator 12. On the inner circumference of the stator 12 there are 12 equally spaced stator poles, 14a –d, 16a –d, 18a –d, said stator poles being, therefore, on 30° centers. The stator pole windings have been deleted from FIG. 1 in the interest of clarity. On the outer circumference of the rotor 10 there are eight equally spaced rotor poles: 20, 22, 24, 26, 28, 30, 32 and 34, said rotor poles being, therefore, on 45° centers. The rotor 10 and its associated poles 20–34 are formed of permeable material but have no windings associated with them.

Figure 2:
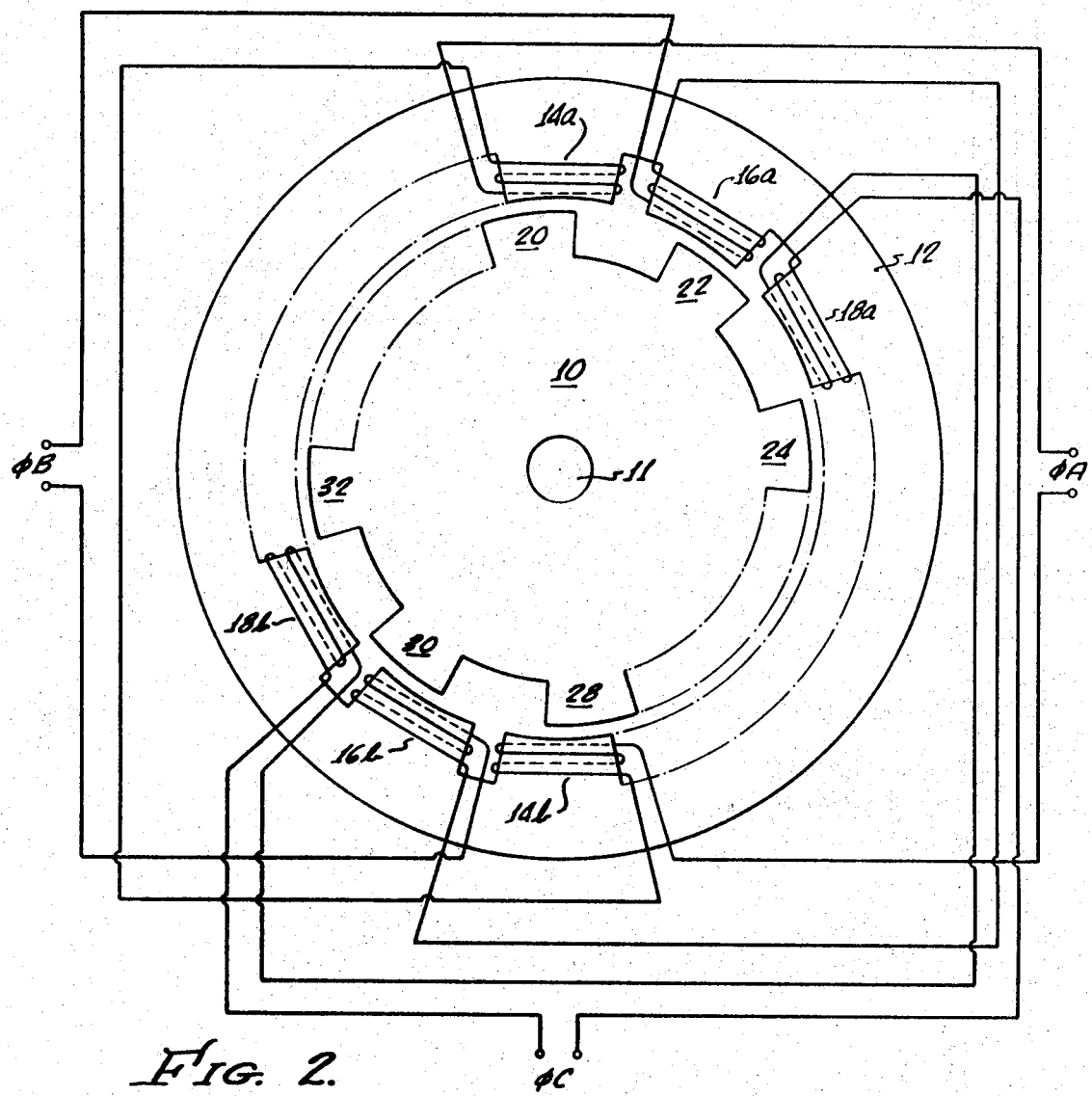
FIG. 2 shows a schematic illustration of the FIG. 1 stepping motor, with the rotor in the same position as in FIG. 1, but with the stator pole windings shown on six poles, the remaining stator poles and unaffected rotor poles being deleted for clarity.

FIG. 2 illustrates the interaction of stator and rotor poles. The rotor is shown locked in a detent position with stator poles 14a, 14b, 16a, and 16b energized, and therefore attracting rotor poles 20, 22, 28 and 30 into positions straddling the stator pole positions. With both ΦA and ΦB energized and ΦC deenergized, magnetic flux passes from stator pole 14a through rotor pole 20, the rotor body, and rotor pole 28 to stator pole 14b. Likewise, magnetic flux passes from stator pole 16a through rotor pole 22, the rotor body, and rotor pole 30, to stator pole 16b. The magnetic attraction caused by the flux through stator poles 14a and 14b tends to rotate rotor poles 20 and 28 in a clockwise direction. Likewise, rotor poles 22 and 30 tend to rotate in a counterclockwise direction about shaft 11. These counter attractions lock the rotor in the position shown, with two rotor poles, 20 and 22, or 28 and 30, straddling two stator poles, 14a and 16a, or 14b and 16b, respectively.

Although not shown in FIGS. 1 and 2 for clarity, stator poles 14c and 14d are also connected to ΦA, stator poles 16b and 16c are likewise also connected to ΦB and stator poles 18c and 18d, are connected to ΦC. All poles connected to a given phase are simultaneously energized by that phase, and diametrically opposed stator poles are wound with coils such that if magnetic flux passes out of one pole it passes into the opposite pole.

The means used in the prior art for exciting a motor such as shown in FIGS. 1 and 2 for advancing the rotor from one detent position to the next are as follows: Assume, to begin with, that ΦA and ΦB are energized and the rotor is locked in the detent position shown in FIGS. 1 and 2. If the rotor is to be rotated to the next detent position, ΦA is deenergized and ΦC is energized, leaving ΦB in its previously energized condition. The interaction of the stator and rotor poles can be understood by explaining only the action of stator poles 14a, 16a and 18a on rotor poles 20, 22 and 24, since all remaining rotor and stator poles will operate identically. When stator pole 14a is deenergized the previous attraction to rotor pole 20 ceases. The uninterrupted attraction of stator pole 16a still tends to rotate rotor pole 22 in a counterclockwise direction. The attraction of stator pole 18a, now energized by ΦC, tends to rotate rotor pole 22 in a clockwise direction and rotor pole 24 in a counterclockwise direction. The rotor rotates until it is locked in a new detent position with rotor poles 22 and 24 straddling stator poles 16a and 18a. This new detent position of the rotor 10 is 15° counterclockwise from the position of FIGS. 1 and 2. This prior art means of excitation of stepping motors suffers from the following inefficiency. While stator pole 18a attracts rotor pole 24, tending to rotate rotor pole 24 in a counterclockwise direction, it similarly attracts rotor pole 22, tending to rotate it in a clockwise direction. Therefore, any energy applied to ΦC and stator pole 18a is wasted until the force between stator pole 16a and rotor pole 22 have rotated the rotor in a counterclockwise direction a distance sufficient to move rotor pole 22 away from and rotor pole 24 toward stator pole 18a.

The present invention provides a novel means and method for driving an incremental motor, as follows: Assume again that the rotor is locked in the position shown in FIGS. 1 and 2 by the interaction of stator poles 14a and 16a with rotor poles 20 and 22. Advancement of the motor is initiated in the preferred embodiment by deenergizing stator pole 14a and simultaneously applying an energy pulse to stator pole 16a. This energy pulse is selected to provide substantially more magnetic flux in stator pole 16a than that produced by the normal locking signal. This flux strongly attracts rotor pole 22 toward stator pole 16a, rotating the rotor in a counterclockwise direction. It will be understood that while stator pole 16a is being pushed to accelerate rotor pole 22, stator poles 16b, 16c and 16d are similarly accelerating rotor poles 30, 26 and 34, since each of these stator poles is connected to ΦB. This acceleration occurs during a relatively short time period, at the end of which ΦB and ΦC connected to stator poles 16a and 18a are energized to the normal detent level to lock rotor poles 22 and 24 about them. Similarly, stator poles 16b, 16c, 16d, 18b, 18c and 18d are then energized to the normal detent level to lock their respective rotor pole pairs. This drive sequence allows all flux produced during the beginning of each sequencing operation to drive the rotor forward, i.e., all primary forces are exerted on the rotor in a counterclockwise direction.

It can be seen from FIG. 1 that the angle between the detent position shown and the next detent position, wherein rotor poles 22 and 24 straddle energized stator poles 16a and 16b, is 15°—this produces 24 detent positions for every rotor revolution. Thus, if the normal detent voltage on each phase is 13 volts, and the accelerating pulse is 30 volts, the following sequence of phase energization will step the rotor in 15° counterclockwise increments:

SEQUENCE I

1. Φ A–13 volts, Φ B–13 volts
2. Φ B–30 volts
3. Φ B–13 volts, Φ C–13 volts
4. Φ C–30 volts
5. Φ C–13 volts, Φ A–13 volts
6. Φ A–30 volts
7. repeat (1)–(6) above The duration of the 30-volt pulse, applied in turn to each phase, is predetermined by the driving circuit. Thus, if the motor is to be run at a very slow rate, the detent voltages will be maintained for a period of time which is long in comparison to that of the 30-volt pulse. If, however, the motor speed increases, the 30-volt-time segment will occupy an increasing percentage of the total time, that is, the duration of the 13-volt-detent pulses decreases.

When the motor is to be driven at extremely high rates of speed, it is advantageous to delete the 13-volt-detent signals altogether, thereby eliminating any magnetic forces which tend to slow the rotor rotation. Thus, the driving circuit of the present invention alters the excitation sequence whenever the motor is driven above a predetermined rate of rotation. This new sequence is as follows:

SEQUENCE II

1. Φ B–30 volts
2. Φ C–30 volts
3. Φ A–30 volts
4. repeat (1)—(3) above

The rate of rotation at which Sequence II begins, and the normal detent (Sequence I) ends, is determined by the predetermined time duration of the 30-volt pulse applied to each phase. Thus, once the rotor rotation rate is high enough so that before the rotor reaches one detent position it is being urged on to the next detent position, the sequence changes from Sequence I to Sequence II. Under these circumstances the time required for the rotor to rotate through 15° increments is shorter than the normal 30-volt pulse. The 13-volt-detent pulses now disappear, and the duration of 30-volt pulses is made shorter as the rotor revolution rate increases. Therefore, the 30-volt-pulse width is a predetermined value until the sequence changes from Sequence I to Sequence II, at which time it is further decreased by the motor control circuitry as the motor rate increases.

Figure 3:
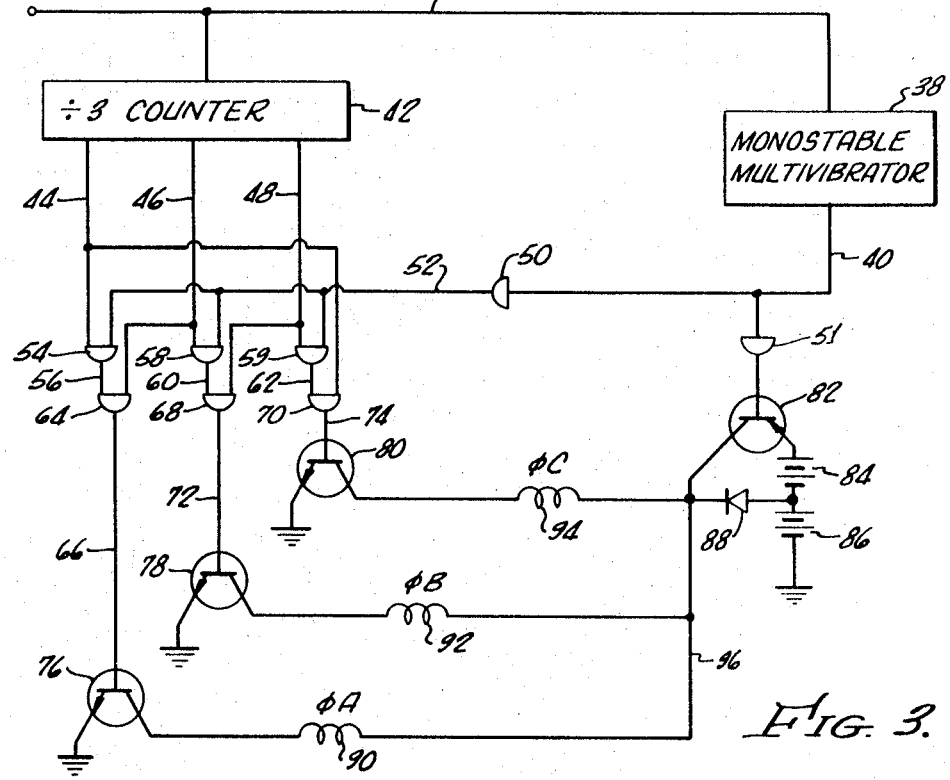
FIG. 3 is the logic circuit in schematic form which drives the three phase windings of the stepping motor.
Figure 5:
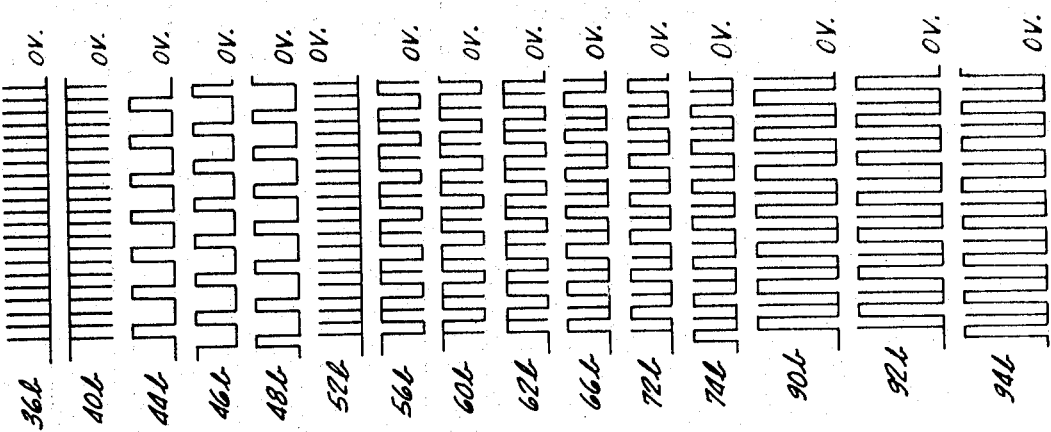
FIG. 5 illustrates the waveforms on the leads of the circuit of FIG. 3 when the stepping motor is being sequenced at a fast rate.
Figure 4:
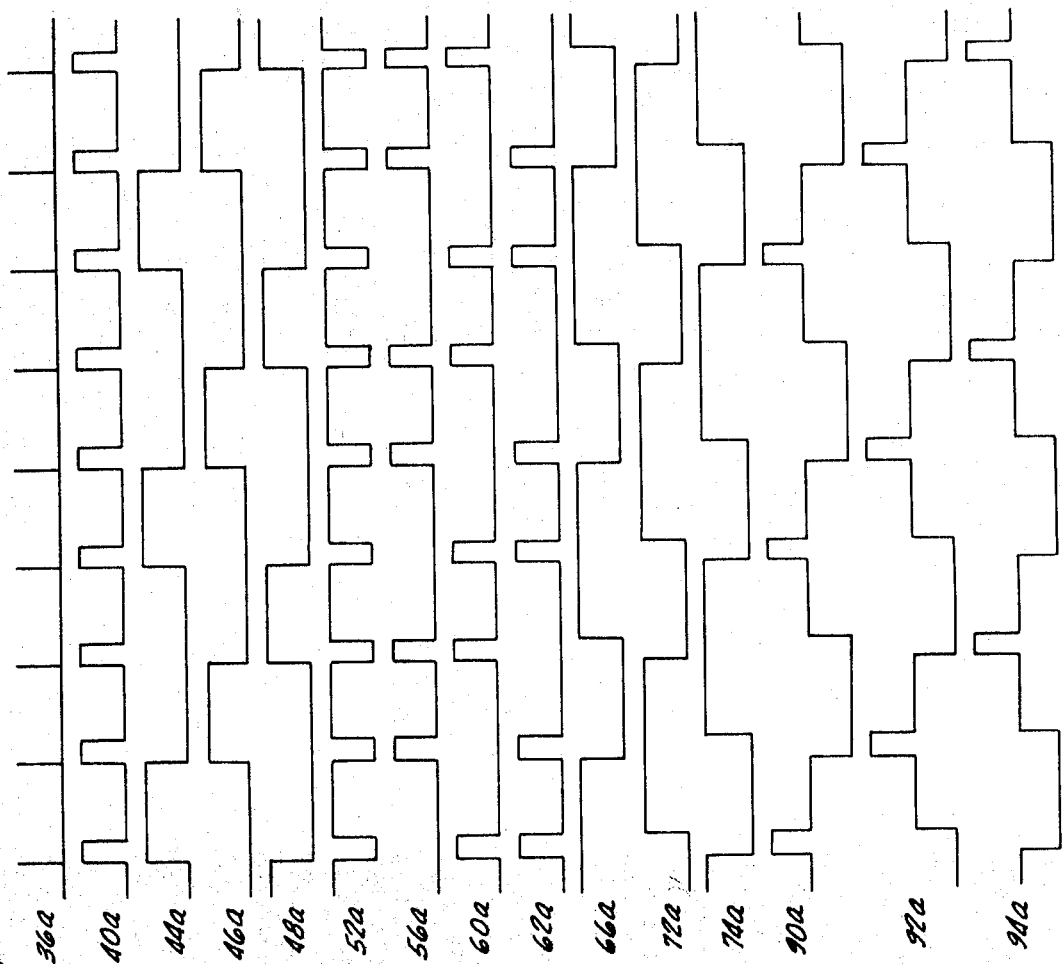
FIG. 4 illustrates the waveforms on the various leads of the logic circuit of FIG. 3 when the stepping motor is being sequenced at a slow rate.

The motor control circuit of the present invention is best described in reference to FIGS. 3, 4 and 5. FIG. 3 shows the drive control circuit itself, while FIGS. 4 and 3 represent the waveforms on the various circuit leads during low and high rate sequencing respectively.

The slow rate sequencing, Sequence I, shown in FIG. 4 will be described first.

The input signal 36 is driven from an external drive pulse supply with the pulse train 36a. The time increment between pulses determines the length of the pause at each rotor detent position, and each pulse, in turn, will cause the rotor 10 to rotate through a 15° increment between detent positions as shown in FIG. 1.

This input signal on line 36 is coupled to a timing circuit which, in the preferred embodiment, is a retriggerable monostable multivibrator 38 which produces an output signal on line 40 as shown at 40a. This output signal 40a normally has a zero value. However, each pulse of the input signal 36a initiates a positive pulse on line 40. This pulse has a duration predetermined by the monostable multivibrator circuit 38, and signal 40a returns to zero value after this predetermined duration. The pulse train shown at 40a is therefore a series of fixed-duration pulses the leading edges of which are separated by the time duration between the input pulses shown at 36a.

The input line 36 is also coupled to a 3 counter 42 which produces output signals on lines 44, 46 and 48 shown at 44a, 46a and 48a respectively. Each new input pulse on line 36 will initiate a positive-going pulse on one of the output lines 44, 46 or 48, and terminate such a pulse on another one of the output lines 44, 46 or 48. This produces a sequence of pulses on the three output lines 44, 46 and 48 wherein the signal 44a is positive between two adjacent pulses in signal 36a, while signal 46a and 48a are both zero valued. Between the next two adjacent pulses of the input drive signal 36a, signal 46a is positive, 44a and 48a zero valued. The next pulse of input drive signal 36a produces a positive pulse on 48a and zero value signals on 44a and 46a. This sequence repeats itself as pulses on line 36 continue, the duration of the positive pulse on any of the output lines 44, 46 or 48 determined by the time delay between the input drive pulses on line 36.

Lead 40 is coupled to an inverter 50 which produces on its output line 52 a signal 52a which is the complement of the signal 40a. Thus, whenever the signal 40a is positive, the signal 52a is zero valued, and vice versa.

The signals 44a and 52a are coupled to a NOR-gate 54, the output of which is on line 56 and shown as the signal 56a. The NOR-gate 54 produces a positive signal on line 56 only when the signals 44a and 52a are zero valued. The signal 56a is therefore a reproduction of the signal 40a with every third pulse deleted.

In a similar manner NOR-gates 58 and 59 receive input signals from leads 46, 52 and 48, 52, respectively, and produce output signals 60a and 62a on lines 60 and 62 respectively. The three signals 56a, 60a and 62a therefore reproduce the signal 40a, but each with every third pulse deleted, the deleted pulse in the three signals 56a, 60a and 62a being staggered such that when two signals have positive pulses, the third is zero valued.

Leads 56 and 46 are coupled to another NOR-gate 64 which produces an output signal 66a on line 66. This NOR-gate 64 functions in the same manner as NOR-gates 54, 58 and 59, producing a positive signal whenever signals 56a and 46a are zero valued.

Likewise, two additional NOR-gates 68 and 70 are coupled to lines 60, 48 and 62, 44, respectively, producing output signals 72a and 74a on lines 72 and 74 respectively. These output signals 66a, 72a and 74a therefore present an overlapping sequence of pulses, each new pulse being initiated a fixed time after the duration of a pulse on line 36, the fixed time equaling the duration preset by the monostable multivibrator 38.

Switching transistor 76 has its base connected to lead 66 and its emitter connected to ground. A positive signal on lead 66 will make the collector of transistor 76 conductive to ground through the emitter of transistor 76. Therefore, the conductive cycling of transistor 76 will ground the collector of transistor 76 whenever signal 66a is positive. Likewise, two transistors 78 and 80 are identically connected to lines 72 and 74 respectively, so that their collectors are grounded whenever signals 72a and 74a, respectively, are positive.

The base of a switching transistor 82 is connected to lead 40 through an inverter 51 such that when signal 40a is positive, the transistor 82 is conductive. The emitter of transistor 82 is connected through two series batteries 84 and 86 to ground. The potential of battery 84 is typically 17 volts, and that of battery 86 is approximately 13 volts. The junction between these batteries is connected through a diode 88, to the collector of transistor 82 and a motor common lead 96. Thus, the voltage on the motor common lead 96 is 13 volts whenever the transistor 82 is nonconductive, that is, whenever the signal 40a has zero value, since motor current on lead 96 is supplied from battery 86 through diode 88. However, when the signal 40a is positive, transistor 82 conducts diode 88 becomes nonconductive and motor current on lead 96 is supplied from both batteries 84 and 86. The potential on the motor common lead 96 is therefore the sum of the potentials of batteries 84 and 86, or approximately 30 volts.

The coil 90 represents the windings on all motor stator poles which are energized by phase A, that is, poles 14a, 14b, 14c, and 14d. Current can flow through coil 90 only when transistor 76 is conducting, that is, only when signal 66a is positive. However, the current which flows through coil 90 may flow from either the battery 86 through diode 88 when transistor 82 is nonconductive, or from both batteries 84 and 86 when transistor 82 is conductive, that is, when signal 40a is positive. This composite signal, shown at 90a, therefore represents zero volts whenever signal 66a is zero valued, 13 volts whenever signal 66a is positive but signal 40a is zero valued, and 30 volts whenever both signals 40a and 66a are positive. This, then, is the drive signal which was described earlier as providing the most advantageous use of magnetic flux for driving the rotor 10 forward at low speeds.

Likewise, coils 92 and 94 which represent the windings on all motor stator poles which are energized by ΦB and ΦC respectively, that is, stator poles 16a, 16b, 16c, 16d and 18a, 18b, 18c, 18d respectively, are energized in an identical manner through transistor 78 and 80 respectively. The composite signal present in coil 92 is shown as 92a, and that in 94 is shown as 94a.

Rapid rotation of the motor, Sequence II, is best described with reference to FIGS. 3 and 5. The input drive pulses on line 36 now come in rapid succession, as shown in 36b. In this instance the time delay between the pulses of 36b is shorter than the preset pulse duration of the monostable multivibrator 38, so that the output signal 40b has a positive value at all times, except when the timing sequence of the multivibrator 38 is being reinitiated by a new input pulse, at which time the signal 40b momentarily falls to zero value as shown. This momentary interruption can be made extremely short, and does not appreciably affect the motor drive operation.

The 3 counter 42 operates in the same way as described for slow running of the motor, producing outputs 44b, 46b and 48b on lines 44, 46 and 48 respectively.

The inverter 50 again produces the complement of signal 40b on line 52, as shown at 52b.

NOR-gates 54, 58 and 59 now combine signal 52b with signals 44b, 46b and 48b as before, but since signal 52b is virtually always zero valued, these NOR gates now function as inverters on lines 44, 46 and 48. Thus, except for the momentary pause to recycle multivibrator 38, signals 56b, 60b and 62b are now merely complements of signals 44b, 46b and 48b.

NOR-gates 64, 68 and 70 function in the same manner as described above for slow speed motor operation. However, due to the input signals which they receive during rapid operation, these NOR gates reproduce the original signals produced by the 3 counter 42. Thus, except for the momentary pauses due to recycling of the multivibrator 38, signal 66b is identical to signal 44b, signal 72b to signal 46b, and signal 74b to signal 48b. Stated in another way, the logic circuitry comprising inverter 50 and NOR-gates 54, 58, 59, 64, 68 and 70 produce no net change in the signal from the 3 counter 42 and, in effect, become inoperative during rapid rotation of the motor.

Likewise, since signal 40b is virtually always positive, transistor 82 is always conductive, and the motor common lead 96 maintains a 30-volt potential due to batteries 84 and 86. Therefore, the signals through ΦA, ΦB and ΦC, in coils 90, 92 and 94, respectively, are merely a 30-volt reproduction of signals 66b, 72b and 74b respectively.

The rapid rotation signals on the various phase windings are therefore as described above for efficient rotation, the detent voltages having been eliminated so that virtually all magnetic flux urges rotation of rotor 10.

As an example of the increase in performance which may be realized by utilization of this improved driving method, a typical stepping motor, the IMC Magnetics Corp. 015–016 motor, is limited to starting rates of approximately 600 steps/sec. when driven by prior art driving circuits responding to periodic input pulses, while the maximum starting rate is approximately 1,250 steps/sec. when driven by the present invention circuit responding to the same input pulses. In this example, the normal pulse duration of the retriggerable monostable multivibrator 38 is 0.8 millisecond.

While the above-detailed description has shown the fundamental features of the invention as applied to a preferred embodiment, it will be understood that various omissions and substitutions in the form and details of the device and method illustrated may be made by those skilled in the art without departing from the spirit of the invention. It is the intention, therefore, to be limited only as indicated by the scope of the following claims.

What is claimed is:

1. A drive system for a stepping motor, said motor having a plurality of magnetic detent positions to which a movable actuator is selectively attracted by selective energization of a plurality of coils, comprising:
    first logic means for energizing in sequential steps adjacent coils in pairs to a first energy level, each successive coil pair being adjacent to and including one coil from the immediately preceding coil pair, said sequential steps being initiated by input signal pulses occurring at a variable rate, each of said input signal pulses initiating attraction of said actuator to a new detent position;
    second logic means responsive to said input signal pulses for sequentially energizing said one coil common to said preceding and successive pairs to a second energy level for a time period shorter than a sequential step between energization of said coil pairs, and
    means for energizing in sequential steps adjacent individual coils whenever the rate of said input signal is above a predetermined frequency.

2. A drive system for a stepping motor, said motor having a plurality of magnetic detent positions to which a movable actuator is selectively attracted by selective energization of a plurality of coils comprising:
    first logic means for sequentially energizing adjacent coils in pairs to a first energy level to establish said magnetic detent positions, each successive coil pair being adjacent to and including one coil from the next previous coil pair, each sequential step interposed by a delay time period; and second logic means for sequentially energizing said one coil to a second energy level during said delay time period and for a time shorter than one of said sequential steps to rapidly rotate said rotor between said magnetic detent positions, said second energy level being higher than said first energy level.

3. A system for driving a stepping motor for an incremental tape recorder in which the stepping motor includes a rotor having a plurality of rotor poles, a stator having a plurality of stator poles different in number from said plurality of rotor poles, and a winding formed on each of said stator poles, comprising:

means responsive to a series of input signal pulses for selectively energizing to a first energy level pair sets of said stator coils to establish a first level of magnetic flux in pair sets of said stator poles, and thereby establish preselected magnetic field detent positions for said rotor, said pair sets of stator poles occurring in sequence such that each new pair set of stator coils contains one coil from the immediately preceding pair set of stator coils, said sequence including a new pair set of stator coils after each of said input signal pulses;

means responsive to said series of input signal pulses for selectively energizing to a second energy level, higher than said first energy level, said one coil for a preselected time period; and means for energizing individual coils in sequence at said second energy level whenever said preselected time period is longer than the period of said series of input signal pulses.

4. A system for driving a stepping motor for an incremental magnetic tape recorder in which the stepping motor includes a rotor having a plurality of rotor poles, a stator having a plurality of stator poles different in number from the plurality of rotor poles and a winding formed on each of said stator poles, comprising:

first means for selectively energizing pair sets of said stator coils to establish a first level of magnetic flux in pair sets of said stator poles, ans thereby establish preselected magnetic field detent positions for said rotor; and second means for substantially reducing the energization of one coil of each pair set of stator coils and simultaneously in creasing the energization of the other coil of each pair set of stator coils so that substantially all of the magnetic flux in said rotor is tending to rotate said rotor toward an adjacent one of said preselected magnetic field detent positions established by said first means before energization of the next sequential pair set.

5. A system for producing incremental rotary motion on a shaft comprising:

a motor comprising:

a rotor, rotatably mounted within said motor, and connected to said shaft, a plurality of rotor poles extending radially outward from said rotor and capable of transmitting magnetic flux to said rotor, a stator, attached within said motor, concentric with said rotor, a plurality of stator poles extending radially inward from said stator and capable of transmitting magnetic flux to said stator, and a plurality of flux-inducing stator coils, one of which is wound about each of said stator poles, said coils interconnected in three groups such that each stator coil of a given group is adjacently flanked by one stator coil from each of the other groups, and such that opposite stator coils always induce flux in the same radial direction; and a motor drive circuit responsive to a series of input pulses, comprising:

a voltage supply which produces a first and second output, said first output having a higher potential than said second output, voltage switching means connected to said voltage supply, which couples said first output to all of said three groups for a predetermined time initiated by each of said input pulses, and couples said second output to all of said three groups at all other times; and logic switching means connected to enable current to flow from said voltage supply through each of said three groups in sequence such that current through one of said three groups is initiated at the end of said predetermined time after each of said input pulses and terminated on the second of said input pulses occurring thereafter.

6. A drive system for a stepping motor responsive to an input signal, said stepping motor having a plurality of magnetic detent positions to which a movable actuator is selectively attracted by selective energization of a plurality of coils comprising:

means responsive to input signals below a predetermined frequency for energizing in sequential steps adjacent coils in pairs, each successive coil pair being adjacent to and including one coil from the immediately preceding coil pair, and means responsive to input signals above said predetermined frequency for energizing in sequential steps adjacent individual coils.

7. A process for driving a stepping motor, said motor comprising a plurality of selectively energizable stator poles and a rotor adapted to rotate in discrete increments determined by the energy state of said stator poles comprising the first step of energizing said stator poles in a sequence of pairs at a first energy level with a delay therebetween to define a series of detent positions for said rotor; and the second step of causing substantially all of the magnetic flux in said rotor to tend to rapidly rotate said rotor to the next detent position defined in said first step by energizing said stator poles individually in a sequence such that one pole of the immediately preceding pair is energized at a second energy level during said delay time, said second energy level being higher than said first energy level.

8. A process for driving a stepping motor in response to an input signal, said motor comprising a plurality of selectively energizable stator poles and a rotor adapted to rotate in discrete increments determined by the energy state of said stator poles, comprising the steps of:

below a predetermined input signal frequency by energizing said stator poles in a sequence of pairs; and above a predetermined input signal frequency driving said motor by energizing said stator poles individually in a sequence.

* * * * *

PO-1050
(5/69)

UNITED STATES PATENT OFFICE
CERTIFICATE OF CORRECTION

Patent No. 3,626,269          Dated December 7, 1971

Inventor(s) Donald O. Stanley

It is certified that error appears in the above-identified patent and that said Letters Patent are hereby corrected as shown below:

Col. 1, line 6, after "factors" insert --- --- ---
Col. 3, line 16, "pushed" should be ---pulsed---
Col. 4, line 18, after "signal on" insert ---line---
Col. 4, line 35, before "3" insert --- ÷ ---
Col. 5, line 30, after "conducts" insert --- , ---
Col. 5, line 31, after "nonconductive" insert --- , ---
Col. 5, line 69, before "3" insert --- ÷ ---
Col. 6, line 9, before "3" insert --- ÷ ---
Col. 6, line 14, before "3" insert --- ÷ ---
Col. 7, line 40, "ans" should be ---and---

Signed and sealed this 9th day of May 1972.

(SEAL)
Attest:

EDWARD M. FLETCHER, JR.          ROBERT GOTTSCHALK
Attesting Officer          Commissioner of Patents